United States Patent [19]
Guglielmi et al.

[11] Patent Number: 5,751,768
[45] Date of Patent: May 12, 1998

[54] FRACTIONALLY SPACED EQUALIZING CIRCUITS AND METHOD

[75] Inventors: Franco Guglielmi, Milan; Carlo Luschi, S. Maria Hoé; Arnaldo Spalvieri, Milan, all of Italy

[73] Assignee: Alcatel Italia S.p.A., Italy

[21] Appl. No.: 588,348

[22] Filed: Jan. 18, 1996

[30] Foreign Application Priority Data

Feb. 24, 1995 [IT] Italy ................... MI95A0355

[51] Int. Cl.$^6$ .................... H03H 7/30; H03H 7/40; H03K 5/159
[52] U.S. Cl. ............................ 375/234; 375/232
[58] Field of Search ................. 375/234, 232, 375/233

[56] References Cited

U.S. PATENT DOCUMENTS

| | | | |
|---|---|---|---|
| 4,376,308 | 3/1983 | McNair | 375/14 |
| 4,550,415 | 10/1985 | Debus Jr., et al. | 375/14 |
| 4,969,163 | 11/1990 | Ungerboeck | 375/14 |
| 5,031,195 | 7/1991 | Chevillat et al. | 375/8 |
| 5,095,497 | 3/1992 | Aman et al. | 375/34 |
| 5,309,484 | 5/1994 | McLane et al. | 375/106 |
| 5,414,733 | 5/1995 | Turner | 375/233 |
| 5,481,565 | 1/1996 | Pal | 375/232 |

OTHER PUBLICATIONS

"Fractional Tap-Spacing Equalizer and Consequences for Clock Recovery in Data Modems", G. Ungerboeck, *IEEE Transactions on Communications*, vol. COM-24, No. 8, Aug. 1976, pp. 856–864.

"Performance and Properties of a T/2 Equalizer", S. Qureshi et al, Conf. Rec., *Nataional Telecommunications Conference*, Dec., 1977, pp. 1–9.

"The Tap-Leakage Algorithm: An Algorithm for the Stable Operation of a Digitally Implemented, Fractionally Spaced Adaptive Equalizer", R. Gitlin et al, *The Bell System Technical Journal*, vol. 61, No. 8, Oct. 1982, pp. 1817–1839.

"Decision-Directed Fractionally Spaced Equalizer Control Using Time-Domain Interpolation", C. Siller et al, *IEEE Transactions on Communications*, vol. 39, No. 2, Feb. 1991, pp. 182–186.

(List continued on next page.)

*Primary Examiner*—Stephen Chin
*Assistant Examiner*—Mohammad Ghayour
*Attorney, Agent, or Firm*—Ware, Fressola, Van Der Sluys & Adolphson LLP

[57] ABSTRACT

The present invention relates to a method of fractionally spaced adaptive equalization which allows the achievement of the performances of the optimal linear receiver with a high degree of stability of the control algorithms. The technique is applicable to a generic communication system. The present method provides a fractionally spaced equalizer which is perfectly stable and has a good convergence rate without introducing any deterioration of the performances with respect to the optimal receiver and with an extremely low increase in the complexity of realization as compared to the prior art techniques. The invention is based upon the introduction of a whitening filter of the input signal to a fractionally spaced equalizer stabilized with the tap-leakage technique, where the whitening filter is a device able to make the power spectrum density of the signal—repeated with a period equal to the reciprocal of the signalling interval—constant.

14 Claims, 3 Drawing Sheets

OTHER PUBLICATIONS

"Stabilizing Factionally–Spaced Equalizers", G. Karam et al, Conf. Record, GLOBECOMM 91, 1991, pp. 1807–1811.

"Data Communications Principles", R. Gitlin et al, Plenum Press, New York & London, 1992, pp. 496–499; 538–543; 554–555.

"A New Tap–Adjustment Algorithm for the Fractionally Spaced Equalizer", T. Uyematsu et al, Conference Record, *GLOBECOMM '85*, Dec. 1985, pp. 1420–1423.

"An Efficient Exact–Least–Squares Fractionally Spaced Equalizer Using Intersymbol Interpolation", J. Cioffi et al, *IEEE Jornal on Selected Areas in Communications*, vol. SAC–2, No. 5, Sep. 1984, pp. 743–756.

"On Training Fractionally Spaced Equalizers Using Intersymbol Interpolation", F. Ling, *IEEE Transactions on Communications*, vol. 37, No. 10, Oct. 1989, pp. 1096–1099.

J. Proakis, "Digital Communications", 2nd Ed., McGraw–Hill Book Company, 1983, vol. 2/2, p. 417.

S. Haykin, "Adaptive Filter Theory", Prentice–Hall, Englewood Cliffs NJ, p. 48.

FRACTIONALLY SPACED EQUALIZING CIRCUITS AND METHOD

TECHNICAL FIELD

The invention relates to a method of fractionally spaced adaptive equalization, to a relative equalizer, to a receiver and to a communication system including such an equalizer.

BACKGROUND OF THE INVENTION

Adaptive equalization is a technique commonly used for compensating the distorting effect of the channel in a generic transmission system. The classic technique uses synchronous equalizers realized by a finite impulse response (FIR) filter with variable coefficients time-spaced by an amount equal to the signalling interval or symbol time (see FIG. 2, which is a block diagram of a generic FIR filter, with T' equal to the signalling interval). The performances of such equalizers depend sensibly on the phase of the symbol synchronism reconstructed in reception. An improvement of the performances can be achieved by using the so-called fractionally spaced equalizers (FSE), constituted by an adaptive FIR filter with spaced coefficients of a fraction of the signalling interval (see FIG. 2 with T' equal to a fraction of the signalling interval). The performances of the fractionally spaced equalizers (with a sufficiently high number of coefficients) are practically independent from the phase characteristic of the transmission channel and from the phase of the symbol synchronism reconstructed in reception. More generally, an FSE is capable of realizing in an adaptive manner and in a single device, the functions of adaptive filtering and equalization, i.e. the optimum linear receiver (in this connection, see the article by G. Ungerboeck "Fractional Tap-Spacing Equalizer and Consequences for Clock Recovery in Data Modems", IEEE Transactions on Communications, Vol. COM-24, No. 8, August 1976, pages 856 to 864 and the article by S. U. H. Qureshi and G. D. Forney Jr. "Performance and Properties of a T/2 Equalizer", Conf. Rec., Nat. Telecommun. Conf., December 1977, pages 11: 1–9). However, the fractionally spaced equalizer intrinsically has two problems: (a) the phenomenon of the tap-drifting and (b) the low convergence rate. Both these aspects depend on the fact that, contrary to what happens with a synchronous equalizer, a FSE has in general more configurations of the coefficients that substantially correspond to the same mean square error (MSE) value. In other words, the mean square error does not change significantly (along certain directions) around the point corresponding to the optimum configuration of the coefficients. Through experiments it has been found that a digitally implemented FSE has a long term instability because of inevitable polarizations occurring in the control circuits. Such behaviour leads the equalizer to operate with such high coefficient values as to cause overflow phenomena in the registers or saturation in the coefficients, with a consequent deterioration of the performances. In order to fully exploit the FSEs, it is therefore necessary to use suitable stabilization techniques of the conventional control algorithms capable of avoiding the coefficient drift phenomenon and of increasing the convergence rate. In this connection, at the beginning of the eighties, R. D. Gitlin, H. C. Meadors Jr. and S. B. Weinstein, in the article "The Tap-Leakage Algorithm: An Algorithm for the Stable Operation of a Digitally Implemented, Fractionally Spaced Adaptive Equalizer", published on the Bell System Technical Journal, vol. 61, No. 8, October 1982, at pages 1817 to 1839, proposed to change the FSE control algorithm through the introduction of a controlled quantity of fictitious white noise (tap-leakage technique). Such a technique is effective as a countermeasure against the tap-drifting and improves the convergence rate but involves a deterioration of the FSE performances. In spectral terms, the out-of-band fictitious noise controls the transfer function of the equalizer at the outside of the roll-off region of the signal spectrum, but the in-band noise conditions the achievement of the optimum configuration of the coefficients. Subsequently, T. Uyematsu and K. Sakaniwa, in the article "A New Tap-Adjustment Algorithm for the Fractionally Spaced Equalizer", Conf. Rec., GLOBECOM '85, December 1985, pages 1420 to 1423, proposed a change in the tap-leakage algorithm, consisting in the introduction of fictitious noise exclusively in the frequency band where the power spectrum density of the signal is null. In such a way, the transfer function of an FSE of infinite length is forced to zero at the outside of the roll-off region of the received signal, without an additional cost in terms of deterioration of performances. The cost consists in a remarkable increase in the complexity of the algorithm to be implemented. A drawback of the Uyematsu and Sakaniwa technique lies in that, in correspondence with the signal roll-off region, there exist countless transfer functions of the equalizer satisfying the Nyquist criterion, i.e. corresponding to the same MSE. The shaping of the FSE transfer function around the Nyquist frequency can be bound by having recourse to interpolation techniques. Such a strategy has been initially proposed by J. M. Cioffi and T. Kailath in the article "An Efficient Exact-Least-Squares Fractionally Spaced Equalizer Using Intersymbol Interpolation", published on IEEE Journal Selected Areas in Communications, vol. SAC-5, No. 5, September 1984, pages 743 to 755, with the aim of increasing the convergence rate. The idea consists essentially in the minimization of a suitable cost function based on the difference between the equalized signal and the interpolation of data transmitted at the sampling frequency. Later on, F. Ling, in the article "On Training Fractionally Spaced Equalizers Using Intersymbol Interpolation", published on IEEE Transactions on Communications, vol. 37 No. 10, October 1989, pages 1096 to 1099, has determined the optimum interpolator filter, while C. A. Siller and W. Debus, in the article "Decision-Directed Fractionally Spaced Equalizer Control Using Time-Domain Interpolation", published IEEE Transactions on Communications, vol. 39, No. 2, February 1991, pages 182 to 186, have pointed out the efficiency of the interpolation techniques against the coefficient-drift phenomenon. A drawback of stabilization through interpolation is that the FSE has to operate at the sampling frequency, which leads to an increase in the complexity of implementation or of processing rate. Moreover, the interpolation technique does not completely eliminate the tap-drifting phenomenon, since the transfer function of the equalizer at the outside of the signal band is still undetermined. Recently, G. Karam, P. Moreau and H. Sari, in the article "Stabilizing Fractionally-Spaced Equalizers", Conf. Rec., GLOBECOM '91, 1991, pages 1807 to 1811, proposed the use of the interpolation technique in combination with the algorithm of Uyematsu and Sakaniwa. Such an approach allows the stabilization of an FSE without loss of performances, but at the cost of a remarkable increase in the complexity in realizing the receiver.

SUMMARY OF INVENTION

It is an object of the present invention to provide a method and relative circuits capable of overcoming the drawbacks of the known art. According to the present invention, a method of fractionally spaced adaptive equalization of a real or complex signal from a generic transmission channel, including a step of conventional fractionally spaced equalization of distortions introduced by the channel, is characterized by executing in advance a whitening of the signal, wherein said executing is carried out on the signal such that a power spectral density of said signal, repeated with a repetition period equal to a reciprocal of a signalling interval of the signal, is constant.

In further accord with the present invention, a fractionally spaced adaptive equalizer of a real or complex received signal from a generic transmission channel, including an adaptive filter which realizes a fractionally spaced equalization of distortions introduced by the channel, is characterized in that it further comprises a whitening filter disposed upstream of said filter, for acting on the received signal to repeat a power spectral density of said signal with a repetition period equal to a reciprocal of a signalling interval and with a constant power spectral density.

In still further accord with the present invention, a receiver including an equalizer of a real or complex received signal from a generic transmission channel, including an adaptive filter which realizes a fractionally spaced equalization of distortions introduced by the channel, is characterized by further comprising a whitening filter disposed upstream of said adaptive filter for acting on the received signal such that a power spectral density of said received signal repeated with a repetition period equal to a reciprocal of a signalling interval of said received signal is constant.

Still further in accord with the present invention, a communication system including an equalizer of a real or complex received signal from a generic transmission channel comprising an adaptive filter which realizes a fractionally spaced equalization of distortions introduced by the channel, is characterized by further comprising a whitening filter disposed upstream of said adaptive filter and acting on the received signal such that a power spectral density of said received signal repeated with a repetition period equal to a reciprocal of a signalling interval of said received signal is constant.

As set forth above main drawbacks of the known art consist in the long term instability and in the low convergence rate of conventional fractionally spaced equalizers. From a conceptual point of view, the present invention is based on the consideration that the tap-leakage algorithm does not introduce any deterioration in the features when the received signal is such that its power spectral density repeated with a period equal to the reciprocal of the signalling interval is constant (or, equivalently, when the received signal is such that its self correlation function, sampled at instants that are multiples of the signalling interval, is impulsive). As a special case, it results that, on the basis of the previous observation, the tap-leakage algorithm does not introduce any deterioration in the features when the received signal is white, where a white signal is a signal whose power spectral density is constant. Therefore, by introducing simply a whitening filter of the signal at the input of an FSE stabilized with the tap-leakage technique (when a whitening filter is a generic device capable of making the power spectral density of the output signal, repeated with a period equal to the reciprocal of the signalling interval, constant), it is possible to obtain a fractionally spaced equalizer of limited complexity which is stable, has a good convergence rate and does not involve any deterioration with respect to the performance of the optimum receiver. In the following, such a strategy will be identified as prewhitening. It is particularly important to point out that the proposed technique involves an extremely low increase in the complexity of the receiver. The above-mentioned characteristics of stability and convergence rate of the prewhitening technique can indeed be obtained by implementing the whitening filter through an adaptive FIR filter with a very low number of coefficients having a spacing equal to the symbol interval.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
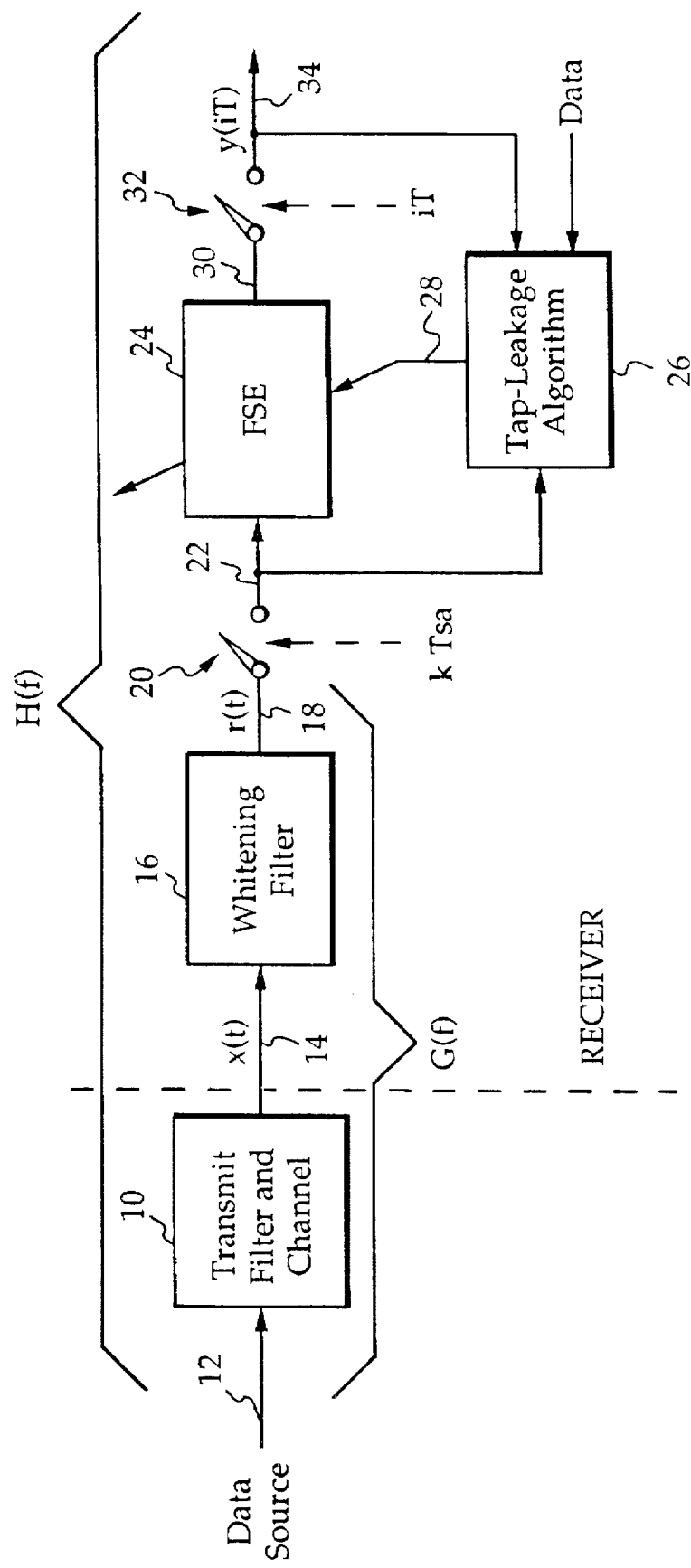
FIG. 1 is a schematic block diagram of the structure of the receiver implementing the prewhitening technique of the present invention.
Figure 2:
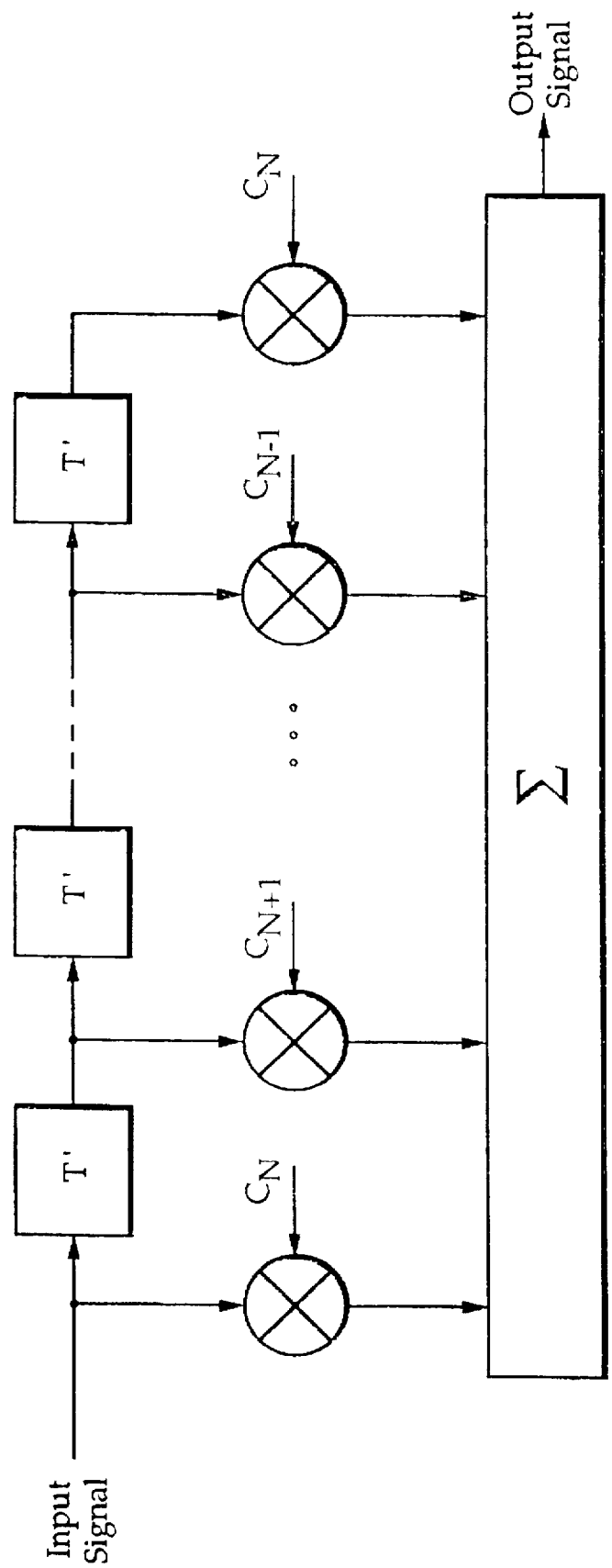
FIG. 2 is a block diagram of a FIR filter.

In order to provide a synthetic interpretation of the phenomena underlying the instability of the FSE, consider an equalizer adapted according to the minimization of the cost function mean squared error (MMSE algorithm). Assume a sampling period $T_{sa}$ as a submultiple of the signalling interval T, i.e. $T_{sa}=T/n$, n being an integer greater than one. Then, define $$r(kT_{sa}) = \sum_{i=-\infty}^{\infty} a_i g(kT_{sa} - iT) + n(kT_{sa}) \tag{1}$$

as the k-th sample of the signal at the input of the FSE. The transmitted symbols are represented by the complex random variables $a_i$ assumed to be independent, evenly distributed, with null average and unit variance. The complex function g(t) represents the equivalent impulse response at the input of the FSE, whose Fourier transform G(f) is assumed to be at limited band in the interval (−n/2T,n/2T). The designation n(t) indicates a stationary noise process with power spectral density $N_o/2$ in the band (−n/2T, n/2T) and zero elsewhere. Letting $c_i$ denote the i-th coefficient of the FSE, the output of the equalizer at the instant t=kT is $$y(kT) = \sum_{i=-L}^{L} c_i r(kT - iT_{sa}) \tag{2}$$

The MSE cost function is defined as $$F=E\{|y(it)-a_i|^2\}=E\{|e_i|^2\} \tag{3}$$

where $E\{.\}$ denotes the averaging operation with respect to the symbols and $e_i$ represents the error at the output of the equalizer for t=iT. Let r(iT) be the column vector whose k-th element is given by $r(iT-kT_{sa})$, with k=−L, . . . , L. Moreover, the channel autocorrelation matrix is defined as $$A=E\{r^*(iT)r^T(iT)\} \tag{4}$$

where the superscript T indicates the transpose of a vector and the asterisk represents the complex conjugation operation. The element (k,l) of A, with k,l=−L, . . . , L, is given by $$A_{k1} = \sum_{i=-\infty}^{\infty} g^+(iT - kT_{sa})g(iT - 1T_{sa}) + \sigma^2 \delta_{k-1} \quad (5)$$

where $\sigma^2 = N_o/2T_{sa}$ is the noise variance and $\delta_k$ represents the Kronecker delta function. Finally, let v denote the channel vector defined as $$v = E\{a_i r^*(iT)\} \quad (6)$$

The k-th element of v is given by $v_k = g^*(-kT_{sa})$. According to the previous definitions, the MSE can be expressed by $$E\{|e_i|^2\} = 1 + c^{T*}Ac - 2\Re\{c^{T*}v\} \quad (7)$$

where c represents the column vector of the FSE coefficients and T* denotes the conjugate transpose operation. The vector of the optimum coefficients and the corresponding MSE are given by $$c_{opt} = A^{-1}v \quad (8)$$

$$F_{opt} = 1 - v^T A^{-1} v \quad (9)$$

provided that matrix A is non-singular. To be noted that, in contrast with the case of synchronous equalizer, matrix A is not a Toeplitz matrix (for the definition of Toeplitz matrix see e.g. S. Haykin, "Adaptive Filter Theory", Prentice-Hall, Englewood Cliffs, page 48). The uniqueness of solution (8) is assured for a finite-length, fractionally spaced equalizer also when the noise power approaches zero (in this connection see the article of R. D. Gitlin, H. C. Meadors Jr. and S. B. Weinstein "The Tap-Leakage Algorithm: An Algorithm for the Stable Operation of a Digitally Implemented, Fractionally Spaced Adaptive Equalizer", Bell System Technical Journal, vol. 61, No. 8, October 1982, pages 1817 to 1839). The optimum configuration of the coefficients can be obtained on the basis of the stochastic gradient algorithm, expressed by $$c(i+1) = c(i) - \gamma e_i r^*(iT) \quad (10)$$

where $\gamma > 0$ is the step-size and c(i) represents the vector of the coefficients at t=iT. It has been found through experiments that the fractionally spaced equalizer updated according to equation (10) is subjected to a drift of the coefficients. Starting from the normal operation condition of the equalizer, after a certain period of time the values of the coefficients start to increase leading progressively to an intolerable deterioration of the performances. Such behaviour can be ascribed to a deterministic component due to polarization unavoidably present in the digital implementation of the equalizer control circuits. Polarization causes an increase in the value of the coefficients, which involves the possibility of overflow of the partial sums or saturation of the value of one or more coefficients. The mechanism just described is at the base of the performance deterioration observed during laboratory tests. The effect of the polarization of the equalizer control algorithm has been studied in the article by R. D. Gitlin, H. C. Meadors Jr. and S. B. Weinstein entitled "The Tap-Leakage Algorithm: An Algorithm for the Stable Operation of a Digitally Implemented, Fractionally Spaced Adaptive Equalizer, published on the Bell System Technical Journal, vol. 61, No. 8, October 1982, pages 1817 to 1839 where it is shown that the steady-state error depends on the reciprocal of the eigenvalues of the matrix A. The qualitative interpretation of such result is based on the relation between magnitude of the eigenvalues and malconditioning condition of the matrix A: if L→∞, $\sigma^2 \to 0$ and n=2, then half of the eigenvalues of A approach zero and consequently the slope of the MSE cost function approaches zero in the directions corresponding to the eigenvectors associated with said eigenvalues. In such a situation even a small polarization of the algorithm can produce a considerable shifting of the coefficients from the optimum configuration. The low slope of the cost function has the further effect on the convergence rate of the equalizer. In spectral terms, the low slope of the functional can be related to the fact that, in absence of noise, the transfer function implemented by the equalizer outside the roll-off region of the signal spectrum has not the effect on the outgoing mean square error, while at the Nyquist frequency there are countless transfer functions corresponding to the same MSE. Letting F(i) denote the mean square error of the i-th iteration, it is possible to show that, in the case of deterministic gradient algorithm, an upper bound of the MSE is given by (see R. D. Gitlin, J. F. Hayes and S. B. Weinstein, Data Communication Principles, Plenum Press, New York, 1992, page 540):

$$F(i+1) - F_{opt} \leq (1-\rho^{-2})^i (F(0) - F_{opt}) \quad (11)$$

where $\rho$ indicates the ratio of the maximum to the minimum eigenvalue of A and the step-size is fixed to the optimum value. Parameter $\rho$, called eigenvalue spread, in the following will be assumed as a measure of the malconditioning of the matrix A: when $\rho = 1$ the matrix is perfectly conditioned and the gradient algorithm converges to a unique iteration; on the contrary, if $\rho \to \infty$ the matrix is malconditioned, which involves the malfunction of the equalizer. In the case of stochastic gradient algorithm the above considerations are still valid provided that a corrective term is introduced which takes into account the number of coefficients of the equalizer (see R. D. Gitlin, J. F. Hayes and S. B. Weinstein, Data Communication Principles, Plenum Press, New York, 1992, page 552).

On the basis of the above description one can understand how the instability and the low convergence rate of the fractionally spaced equalizer derive from the malconditioning of the autocorrelation matrix of the channel A. Indeed, the malfunction of the FSE can be limited by considering, in the cost function (7) to be minimized, instead of A the matrix $$A' = A + \mu B \quad (12)$$

$\mu$ being a positive real number. The stochastic gradient algorithm for the minimization of such modified cost function is $$c(i+1) = c(i) - \gamma(e_i r^*(iT) + \mu Bc(i)) \quad (13)$$

Matrix B, which is assumed to be a Toeplitz matrix, must be designed so as to penalize those situations where the equalizer synthesizes transfer functions different from the optimum one. The effect of the algorithm modification according to equation (13) corresponds to the introduction of an additional virtual disturbance with autocorrelation matrix $\mu B$. The disturbance is "virtual" in the sense that it is not really present in the received signal. It is advisable to notice that such a modification in the cost function may lead to a deterioration of the performances: in fact, for $\mu \to \infty$ the equalizer will synthesize the adaptive filter corresponding to the shaping of the virtual disturbance, without taking into account the intersymbol interference. The tap-leakage algorithm is given by eq. (13) in case of B matrix equal to the identity matrix and corresponds to the introduction of a white virtual disturbance. The equalizer is stabilized by shifting the single coefficient at each iteration of the deterministic factor $(1-\gamma\mu)$.

The eigenvalue spread of $A^1$ is $(\lambda_{max}+\mu)/(\lambda_{min}+\mu)$, where $\lambda_{max}$ and $\lambda_{min}$ are respectively the maximum and the minimum eigenvalue of A. Therefore, by suitably choosing the value of $\mu$, it is possible to control the malconditioning of the matrix $A^1$. The vector of the coefficients of the FSE in steady state condition corresponds to the one that would be obtained if the noise power at the input of the equalizer would be $\sigma^2+\mu$. Therefore, in the absence of selective fading, the sole effect of the leakage is to introduce a compression of the equalized signal, easily recoverable downstream of the FSE without any deterioration of the performances. On the contrary, in the presence of selective fading, the transfer function synthesized by the equalizer differs from the optimum one at a progressively larger extent as $\mu$ is increased thus involving a considerable deterioration in terms of MSE. In conclusion, the tap-leakage technique is effective as a countermeasure against the tap drifting and is capable of improving the convergence rate of the FSE without deteriorating the performances of the receiver only in the circumstance of non-selective transmission channel. Specifically, the condition to be encountered by the input signal in order to be not deteriorated is that its autocorrelation function sampled at kT is impulsive, that is, its power spectral density repeated with a period 1/T is constant. Such condition can be satisfied simply by introducing a whitening filter of the signal at the input of the FSE (prewhitening filter), this meaning a generic device capable of making the power spectral density of the output signal, repeated with period 1/T, constant. The schematic block diagram of the resulting structure of the receiver is illustrated in FIG. 1, where the symbols to which reference is made herein, are also depicted. In this figure there is a block 10 representing the transmission filter and the propagation channel is responsive to a data source signal on a line 12; a relative output sight x(t) thereof on a line 14 is processed by a whitening filter 16, whose output r(t) on a line 18 is sampled at the instants $kT_{sa}$ as symbolized by a sampling switch 20 and subsequently providing samples on a line 22 connected to the input of an FSE block 24 and to the input of a Tap-Leakage Algorithm block 26 for updating the FSE as shown by a signal on a line 28; the output of the FSE on a line 30 is ultimately subsampled at iT as shown by a sample switch 32; the samples thus obtained on a line 34, besides being used in the equalizer control algorithm, are sent to the suitable decision circuits. A whitening filter 16 in accordance with the above definition can be implemented through an adaptive FIR filter with a very low number of T-spaced coefficients and therefore involves a relatively low increase in the complexity of the receiver. In the following, an analytical description of the FSE stabilization strategy according to the prewhitening principle is given for obtaining the fundamental results in a formal manner. Let us assume B is equal to an identity matrix I and consider the case of an absence of thermal noise and an infinite length equalizer. Moreover let G(f) and H(f) denote the equivalent transfer function of the transmission system respectively at the input and at the output of the FSE and $C_\infty(f)$ denote the equalizer transfer function. A result of the classical theory (see R. D. Gitlin, J. F. Hayes and S. B. Weinstein, Data Communication Principles, Plenum Press, New York, 1992, page 496) is that the transfer function of the optimum receive filter (MMSE) can be expressed as $$C_\infty(f) = \frac{TG^*(f)}{T\mu + \sum_{i=-\infty}^{\infty} \left| G\left(f-\frac{i}{T}\right) \right|^2} \tag{14}$$

If $$\frac{1}{T} \sum_{i=-\infty}^{\infty} \left| G\left(f-\frac{i}{T}\right) \right|^2 = \text{constant} = \epsilon_G \tag{15}$$

having designated with $\epsilon_G$ the energy of G(f), then from equations (14),(15) it follows that $$H(f) = G(f)C_\infty(f) = \frac{|G(f)|^2}{\mu + \epsilon_G} \tag{16}$$

Equations (15) and (16) entail that H(f) is a Nyquist's. Then it follows that $h(iT)=F^{-1}[H(f)]=0$ for every $i\neq 0$, while $h(0)=\epsilon_G/(\mu+\epsilon_G)$.

To be observed that, when eq. (15) is verified, it follows from (16) that the output signal is perfectly equalized, independently from the value of u (apart from a scale factor that can be easily recovered downstream of the FSE). Then asymptotically (for $\mu\to\infty$, $\rho\to-1$) the conditions of perfect equalization and perfect conditioning of the equalizer are both reached. Condition (15) is verified if $|G(f)|$ is the square root of a Nyquist filter, independently of its phase characteristic. The previous condition is equivalent to the request that the repetition with a period 1/T of the power spectral density of r(t) be constant (and equal to $\epsilon_G$). Therefore it is here proposed to whiten the signal at the input of the equalizer (i.e. to make its power spectral density constant, according to the above condition) and to adopt at the same time the tap-leakage algorithm for updating the coefficients. As a whitening filter a transverse causal filter with pitch T can be indicatively assumed. Then the signal at the input of the equalizer can be expressed as $$r(t) = x(t) + \sum_{i=1}^{P} s_i x(t-iT) \tag{17}$$

where x(t) indicates the signal at the input of the whitening filter with the i-th coefficient $s_i$. The cross correlation between the cyclostationary signals x(t) and r(t) is defined by $$R_{xy}(\tau) = \frac{1}{T} \int_0^T E\{x(t)r^*(t+\tau)\}dt \tag{18}$$

The optimum coefficients of the whitening filter can be obtained by minimizing the cost function $$J = R_{rr}(0) \tag{19}$$

By setting to zero the partial derivatives of J with respect to the filter coefficients it is obtained $$s = D^{-1}u \tag{20}$$

where the element (k,l) of the Toeplitz matrix D is given by $D_{k,l}=R_{xx}[(l-k)T]$ and the k-th element of u is $u_k=-R_{xx}(-kT)$.

Equations such as in equation (20) are known as Yule-Walker (see e.g. J. G. Proakis, Digital Communications, McGraw-Hill, New York, 1983, page 417). It can be easily verified that, for $P\to\infty$ the repetition with period 1/T of the power spectral density of r(t) is in effect constant. This amounts to showing that samples $R_{rr}(iT)$ are all null except for i=0. In this connection the system of Equation (20) can be rewritten as $$R_{xr}*(iT)=0, i=1,2 \ldots P \qquad (21)$$

Observing that $$R_{rr}(iT) = R_{xr}(iT) + \sum_{k=1}^{P} s_k R_{xr}[(k+i)T] \qquad (22)$$

having taken eq. (21) into account, it can be concluded that, when P→∞, samples at t=iT of the autocorrelation of r(t) are null for each i≠0, while $R_{rr}(0)=R_{xr}(0)=\epsilon_G/T$.

As a result, the repetition at 1/T of the power spectral density of r(t) is constant and equal to $\epsilon_G$. The digital version of the whitening filter is given by the expression $$r(kT_{sa}) = x(kT_{sa}) + \sum_{i=1}^{P} s_i x(kT_{sa} - iT)$$

By making use of the Poisson formula, it is possible to show that the samples of the cross correlation between input and output of the whitening filter can be calculated as $$R_{xr}(iT) = \frac{1}{n} \sum_{k=1}^{n} E\{x(kT_{sa})r^*(kT_{sa} + iT)\} \qquad (23)$$

Equations (19)–(22) are still valid in case of sampled signals, provided that the right-hand side of eq. (23) is used instead of the right-hand side of eq. (18). The validity of the method, therefore, is not conditioned by the type of circuit implementation (analog or digital) of the whitening filter and of the equalizer.

Implementation

Figure 3:
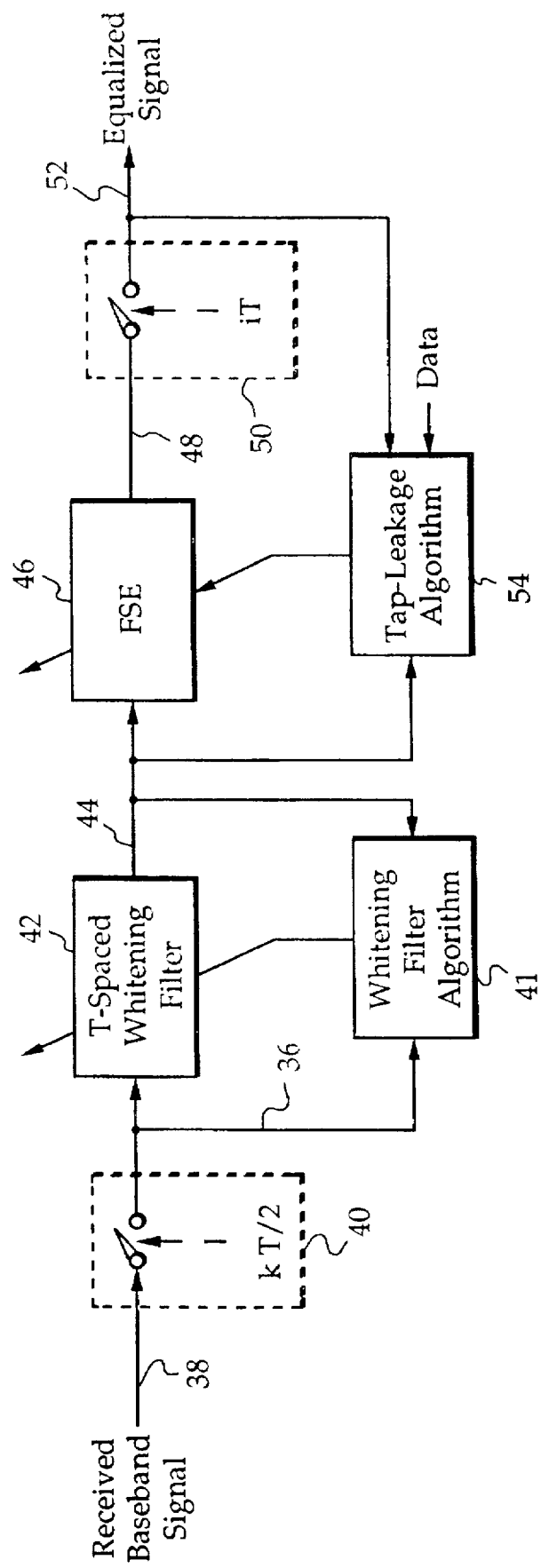
FIG. 3 is a block diagram of a fractionally spaced equalizer stabilized with the prewhitening technique of the present invention.

A special, not limiting, embodiment of the present invention is depicted in FIG. 3 and described hereinafter. With respect to the schematic of FIG. 1, the whitening filter is implemented in digital form and processes the samples on a line 36 as sampled at kT/2 of the in base-band received signal on a line 38 as suggested by a sampling switch 40; consequently, in the context of FIG. 3, the sampler 20 at $kT_{sa}$ at the output of the whitening filter 16 of FIG. 1 is useless and therefore has been omitted in FIG. 3. Moreover, with respect to FIG. 1, a control circuit 41 of the whitening filter has been emphasized in FIG. 3. The base-band received signal (real or complex) on the line 38 is sampled by device 40 at a sampling frequency equal to twice the signalling frequency 1/T. The resulting digital signal on the line 36 is connected at the input of a block 42, constituted by an adaptive T-spaced filter whose coefficients (real or complex) are updated at each symbol time T in accordance with the Yule-Walker equations (20). Therefore, according to equations (20)–(22), block 42 is a whitening filter of the input signal, in the sense that it makes the repetition with period 1/T of the power spectral density of the signal constant. A signal on a line 44 thus obtained is fed to the input of a fractionally spaced equalizer 46, whose coefficients are updated at each symbol time T. To this end, samples on a line 48 at the output of FSE 46 are subsampled by device 50 at the sampling frequency of 1/T. Samples on a line 52 thus obtained are used in an equalizer control algorithm block 54. In the steady state, the FSE is updated with the MMSE algorithm suitably stabilized through the tap-leakage technique which in the present case does not involve any deterioration of the performances with respect to the optimum, given the spectral characteristics of the signal on the line 44. During acquisition, the adaptation algorithm of the coefficients of the fractionally spaced equalizer is switched into a generic algorithm independent from data, suitably stabilized through the tap-leakage technique which assures a good convergence rate. The control algorithm of the whitening filter described by eq. (20), not relying upon the knowledge of data, is capable of correctly updating the coefficients both in transient and in the steady state. The assembly of the whitening filter and FSE stabilized with the tap-leakage technique form a fractionally spaced equalizer which, if the number of the adaptive coefficients is sufficiently high, is perfectly stable without introducing any deterioration of the performances with respect to the optimum receiver. In practice, a degree of stability equivalent to the one of a synchronous equalizer, with a deterioration of the performances absolutely negligible, can be achieved by using a whitening filter composed (in case of complex signals) of two adaptive complex coefficients plus a fixed real coefficient. In conclusion, the signal on the line 52 is perfectly equalized, and a scale factor is easily recoverable by a suitable automatic gain control downstream of the circuit of FIG. 3. The individual blocks of the circuit of FIG. 3 correspond to devices which are known to those skilled in the art, whose realization does not require to provide further circuit details.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Method of fractionally spaced adaptive equalization of a real or complex information signal from a generic transmission channel, including a step of conventional fractionally spaced equalization of distortions introduced by the generic transmission channel, characterized in that the method further comprises a step of:

whitening the real or complex information signal, for providing a whitened real or complex information signal having a constant power spectral density, and having a repetition period equal to a reciprocal of a signalling interval of the real or complex information signal.

2. Method according to claim 1, characterized in that the whitening step comprises a step of adaptive filtering.

3. Method according to claim 2, characterized in that said step of adaptive filtering is a step of finite impulse response filtering with spacing equal to the signalling interval of the real or complex information signal.

4. Method according to claim 3, characterized in that updating of coefficients of the step of adaptive filtering relative to the step for whitening is based upon Yule-Walker equations according to a system of selected equations (20).

5. Method according to claim 1, characterized in that the step of conventional fractionally spaced equalization is obtained through a step of fractionally spaced adaptive finite impulse response filtering which is selectively stabilized.

6. Method according to claim 5, characterized in that said selectively stabilized filtering is obtained through an introduction of virtual noise in an updating of coefficients with an application of a tap-leakage technique.

7. Fractionally spaced adaptive equalizer of a real or complex received information signal from a generic transmission channel, including an adaptive filter which realizes a fractionally spaced equalization of distortions introduced by the channel, characterized in that the fractionally spaced adaptive equalizer further comprises:

a whitening filter disposed upstream of said adaptive filter, that responds to the real or complex received information signal, for providing a whitened real or complex received information signal having a constant power spectral density, and having a repetition period equal to a reciprocal of a signalling interval of the real or complex received information signal.

8. Adaptive equalizer according to claim 7, characterized in that the whitening filter is a whitening adaptive filter.

9. Adaptive equalizer according to claim 8, characterized in that said whitening adaptive filter is a finite impulse response filter with a spacing equal to the signalling interval.

10. Adaptive equalizer according to claim 9, characterized in that updating of the whitening adaptive filter is based upon Yule-Walker equations according to a system of selected equations (20).

11. Adaptive equalizer according to claim 7, characterized in that the adaptive filter which realizes the fractionally spaced equalization of the distortions introduced by the generic transmission channel is a fractionally spaced adaptive finite impulse response filter that is selectively stabilized.

12. Adaptive equalizer according to claim 11, characterized in that said selectively stabilized filter is achieved through an introduction of virtual noise in an updating of coefficients with an application of a tap-leakage technique.

13. Receiver including an equalizer of a real or complex received information signal from a generic transmission channel, including an adaptive filter which realizes a fractionally spaced equalization of distortions introduced by the generic transmission channel, characterized in that the receiver further comprises:

a whitening filter disposed upstream of said adaptive filter that responds to the real or complex received information signal, for providing a whitened real or complex received information signal having a constant power spectral density, and having a repetition period equal to a reciprocal of a signalling interval of said real or complex received information signal.

14. Communication system including an equalizer of a real or complex received information signal from a generic transmission channel comprising an adaptive filter which realizes a fractionally spaced equalization of distortions introduced by the generic transmission channel, characterized in that the communication system further comprises:

a whitening filter disposed upstream of said adaptive filter that responds to the real or complex received information signal, for providing a real or complex received information signal having a constant power spectral density, and having a repetition period equal to a reciprocal of a signalling interval of said real or complex received information signal.

* * * * *